United States Patent
Lisch et al.

(10) Patent No.: US 9,987,787 B2
(45) Date of Patent: Jun. 5, 2018

(54) TWO STAGE SYSTEM AND METHOD FOR MOLDING CONTAINERS

(71) Applicant: DISCMA AG, Zürich (CH)

(72) Inventors: G. David Lisch, Jackson, MI (US); Frederick C. Beuerle, Jackson, MI (US); Theodore F. Eberle, Ann Arbor, MI (US); Kirk E. Maki, Tecumseh, MI (US)

(73) Assignee: DISCMA AG, Zürich (CH)

( * ) Notice: Subject to any disclaimer, the term of this patent is extended or adjusted under 35 U.S.C. 154(b) by 187 days.

(21) Appl. No.: 14/900,721

(22) PCT Filed: Jun. 28, 2013

(86) PCT No.: PCT/US2013/048512
§ 371 (c)(1),
(2) Date: Dec. 22, 2015

(87) PCT Pub. No.: WO2014/209346
PCT Pub. Date: Dec. 31, 2014

(65) Prior Publication Data
US 2016/0129621 A1 May 12, 2016

(51) Int. Cl.
*B29C 49/16* (2006.01)
*B29C 49/46* (2006.01)
(Continued)

(52) U.S. Cl.
CPC ............. *B29C 49/06* (2013.01); *B29C 49/16* (2013.01); *B29C 49/783* (2013.01);
(Continued)

(58) Field of Classification Search
CPC .............. B29C 49/46; B29C 2049/465; B29C 2049/4652; B29C 2049/4664; B29C 49/58; B29C 2049/5803; B29C 49/16
See application file for complete search history.

(56) References Cited

U.S. PATENT DOCUMENTS

| 2011/0135778 A1 | 6/2011 | Andison et al. |
| 2012/0091635 A1 | 4/2012 | Eberle |

(Continued)

FOREIGN PATENT DOCUMENTS

| EP | 1529620 A1 * | 5/2005 | ............. B29C 49/46 |
| JP | 2002067131 A | 3/2002 | |
| WO | 9950047 A1 | 10/1999 | |

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

A method and system for hydraulic blow molding a container from a preform 24. A molding medium is injected into the preform from a nozzle 12 during a first molding stage. In the first molding stage, the molding medium is injected so as to be specifically directed at a closed end of the preform 24. During the first molding stage, the preform is axially stretched in response to the force exerted on the preform by the molding medium. The molding medium is also injected into the preform during a second molding stage, where the molding medium is injected at a flow rate greater than a flow rate during the first molding stage. During the second molding stage, the preform is radially expanded into the shape of the container.

38 Claims, 7 Drawing Sheets

(51) Int. Cl.
  *B29C 49/58* (2006.01)
  *B29C 49/06* (2006.01)
  *B29C 49/78* (2006.01)
  *B29C 49/42* (2006.01)
  *B29C 49/68* (2006.01)
  *B29C 49/12* (2006.01)
  *B29L 22/00* (2006.01)
  *B29L 31/00* (2006.01)

(52) U.S. Cl.
  CPC .......... *B29C 49/4289* (2013.01); *B29C 49/58* (2013.01); *B29C 49/68* (2013.01); *B29C 2049/1219* (2013.01); *B29C 2049/4602* (2013.01); *B29C 2049/465* (2013.01); *B29C 2049/5803* (2013.01); *B29C 2791/007* (2013.01); *B29L 2022/00* (2013.01); *B29L 2031/7158* (2013.01)

(56) References Cited

U.S. PATENT DOCUMENTS

| | | |
|---|---|---|
| 2013/0106027 A1 | 5/2013 | Maki et al. |
| 2013/0122136 A1 | 5/2013 | Fevre et al. |
| 2013/0307197 A1 | 11/2013 | Haesendonckx et al. |

\* cited by examiner

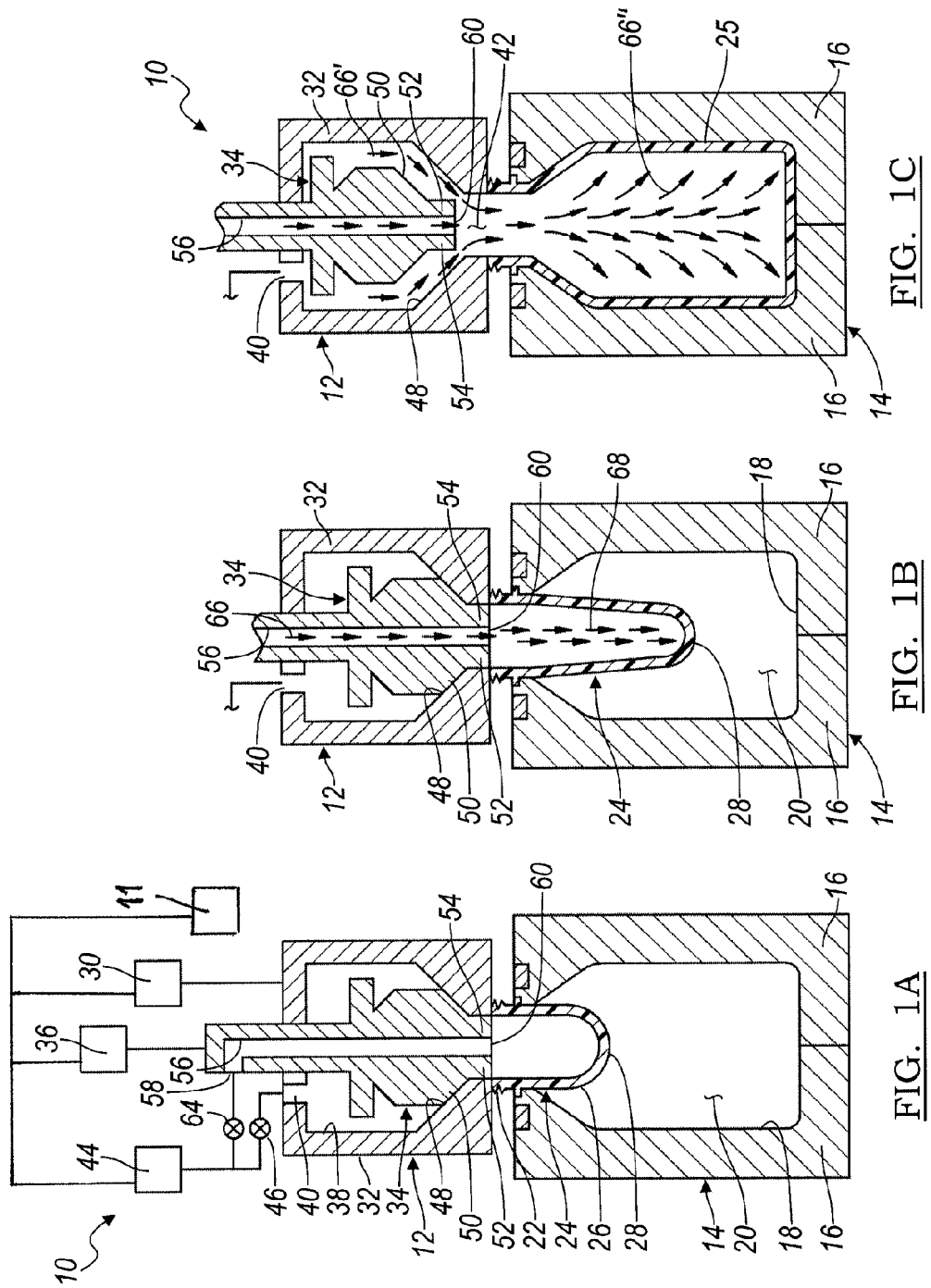

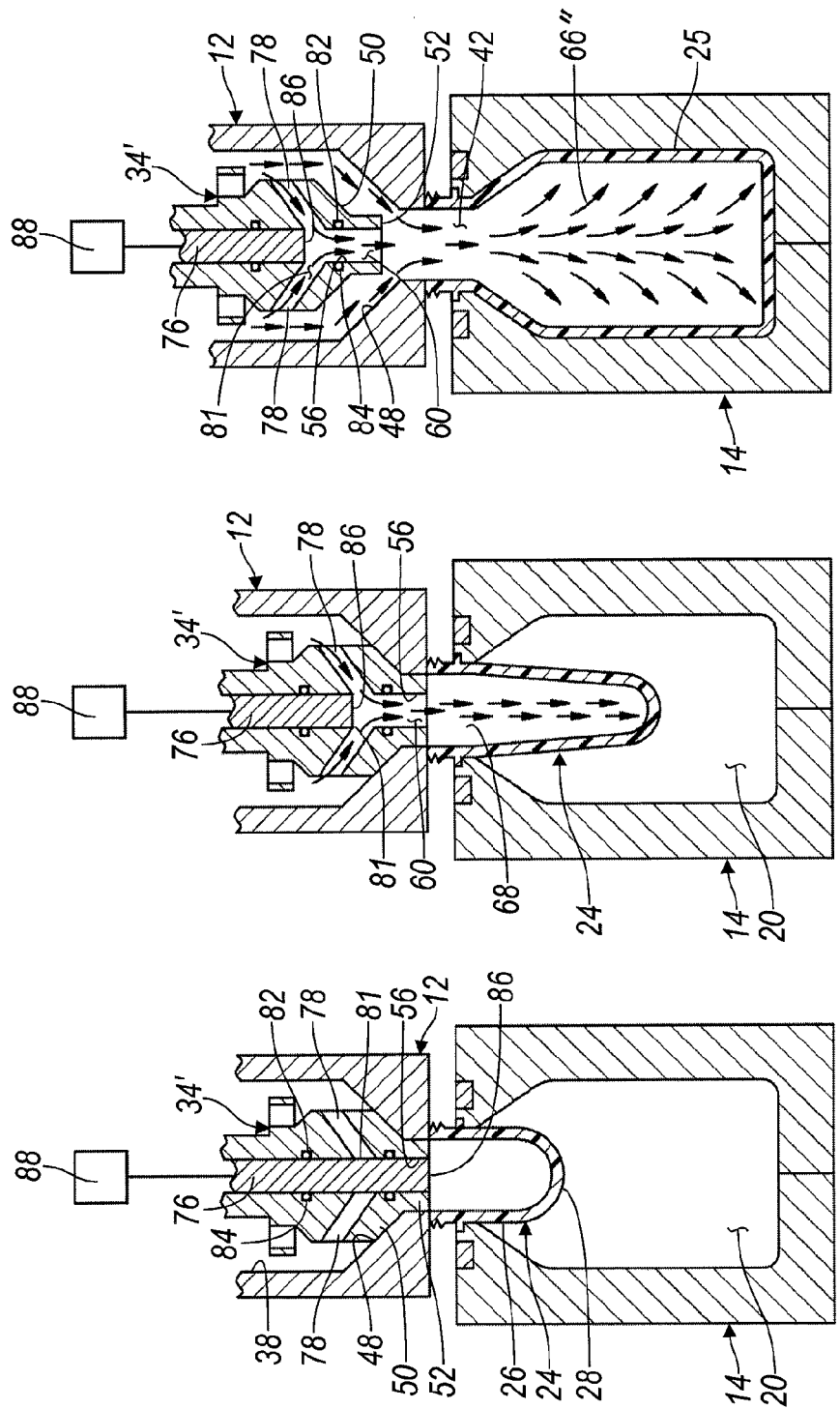

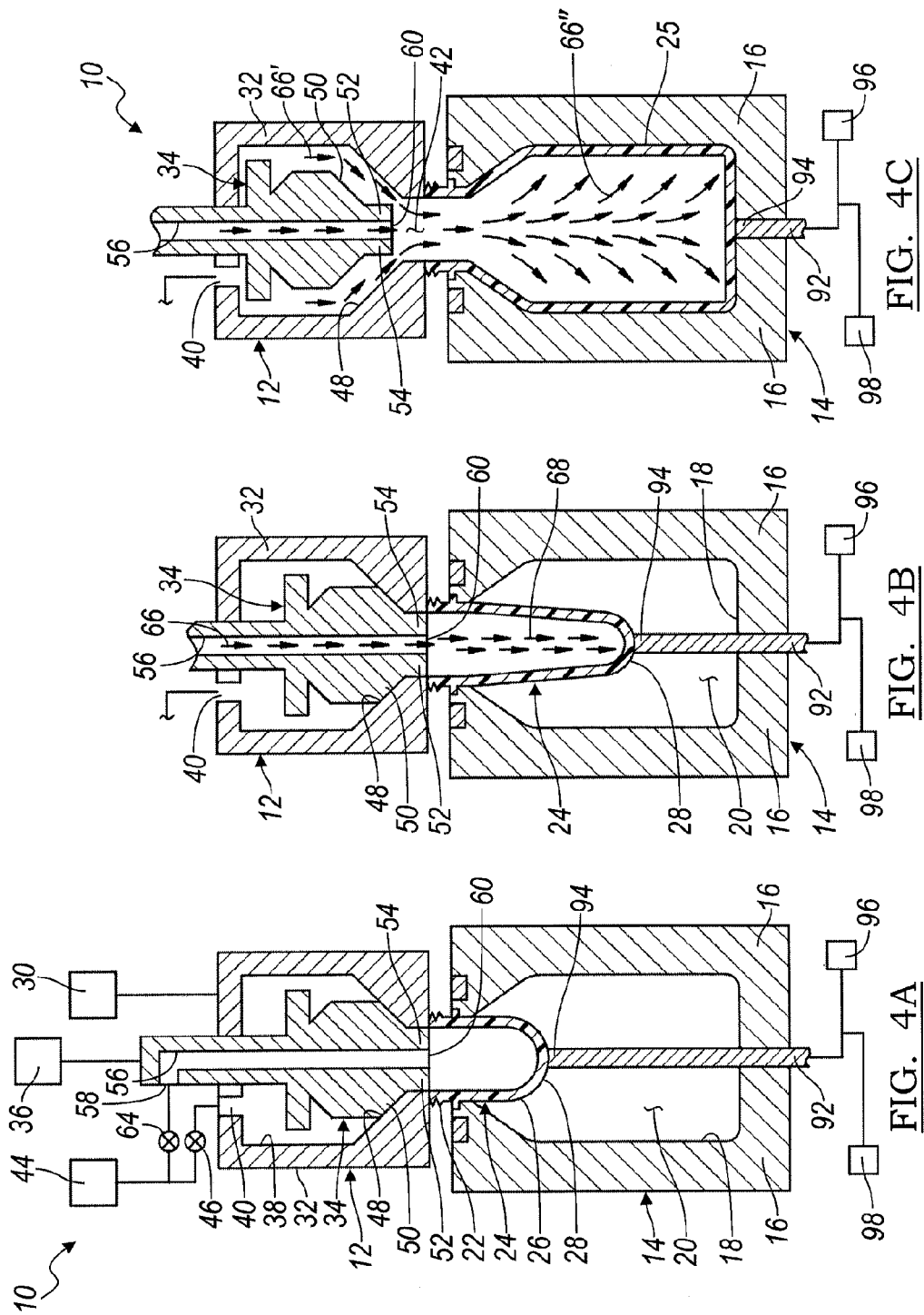

TWO STAGE SYSTEM AND METHOD FOR MOLDING CONTAINERS

BACKGROUND

1. Field of the Invention

The present invention generally relates to the molding of containers for liquid and viscous products. More particularly, the invention relates to a system and method for hydraulic blow molding of a container from a preform.

2. Description of Related Art

Plastic containers are commonly used for the packaging of various products, including liquid products and viscous product. One of the most common forms of plastic container is the blow molded plastic container, which are often formed of polyester materials and, more specifically, polyethylene terephthalate (PET). Blow molded plastic containers are typically formed by placing a heated preform into a blow mold and then inflating the preform with air until the preform contacts the interior surfaces of the mold cavity, which define the final shape of the desired container. Once the inflated preform has been held against the interior surfaces of the mold cavity by the pressure of the blow air for a length of time sufficient to "freeze" the plastic, the molded container is removed from the mold.

The molded containers are then transported to the location where the container will be filled with the intended product. This may include the packaging and shipping of the container to a remote location or may involve the transfer of the container to a local facility where these final steps occur before the finished product is shipped to a retailer or end-user.

With the above method, blow molding and filling are distinct and separate steps in the process of producing a product filled container. A newer process involves the use of the product in the molding of the container. Instead of utilizing air as a blowing medium, this new process utilizes a liquid, and more specifically the actual product being packaged in the container and sold to the end consumer, as the container's molding medium. As used herein, this type of molding is referred to as hydraulic blow molding.

In traditional blow molding, after the heated preform has been introduced into the mold cavity, a stretch rod is often advanced within the preform to initiate longitudinal stretching of the preform before any significant radial expansion of the preform is undertaken by the introduction of blow air. The stretch rod will typically remain within the preform during radial expansion, and is retracted prior to removal of the resultant container from the molding machine.

SUMMARY

In satisfying the above need, as well as overcoming the enumerated drawbacks and other limitations of the related art, in one aspect the present invention provides a method and system for forming a container from a preform.

In one aspect, the invention provides a method of hydraulic blow molding a container from a preform, the method comprising the steps of: positioning a preform within a mold having surfaces defining a cavity in the shape of the container; injecting a molding medium into the preform at a first flow rate during a first molding stage, the molding medium being a liquid and being specifically directed at a closed end of the preform; axially stretching the preform in response to a force exerted on the closed end of the preform by the molding medium during the first molding stage; injecting molding medium into the preform during a second molding stage, the molding medium being injected at a second flow rate during the second molding stage; and radially expanding the preform into the shape of the container during the second molding stage.

In another aspect of the invention, the second flow rate is greater than the first flow rate.

In another aspect of the invention, the molding medium is ejected during the first molding stage from an exit orifice having a diameter that is less than a diameter of an outlet from which the molding medium is ejected during the second stage.

In another aspect of the invention, the step of axially stretching the preform is solely initiated by the force exerted on the preform by the molding medium during the first molding stage.

In another aspect of the invention, the injecting of the molding medium during the first and second molding stages is sequential.

In another aspect of the invention, the injecting of the molding medium during the second stage molding is cumulative with the injecting of the molding medium during the first molding stage.

In another aspect of the invention, the molding medium is passed through a flow straightener prior to being injecting into the preform during the first molding stage.

In another aspect of the invention, the step of axially stretching the preform includes the step of introducing a rod into the preform and injecting the molding medium into the preform through the rod.

In another aspect, the invention includes the step of advancing the rod into the preform during the step of axially stretching the preform, and the step of continuing injecting of the molding medium into the preform as the rod is being advanced.

In another aspect of the invention, during the step of advancing the rod, the rod is prevented from contacting the preform.

In another aspect, the invention includes the step of retracting the rod prior to the step of radially expanding the preform.

In another aspect, the invention includes the step of retracting the rod during the step of radially expanding the preform.

In another aspect, the invention includes the step of extending a centering rod into the mold cavity and engaging a closed end of the preform with the centering rod.

In another aspect, the invention includes the step of extending a centering rod into the mold cavity and engaging a closed end of the preform with the centering rod.

In another aspect of the invention, the centering rod engages the closed end of the preform prior to the axially stretching step.

In another aspect of the invention, during the step of axially stretching the preform, the method further comprises the step of retracting the centering rod while maintaining the centering rod engaged with the closed end of the preform.

In another aspect of the invention, the molding medium is passed through a flow straightener prior to injecting into the preform during the first molding stage.

In another aspect of the invention, the second flow rate exhibits a second velocity and the first flow rate exhibits a first velocity, the first velocity being greater than the second velocity.

In another aspect, the invention provides a molding system for hydraulic blow molding of a preform into a container, the molding system comprising: a nozzle, the nozzle including nozzle body having a main bore extending therethrough from an inlet to an outlet, portions of the main bore defining a valve seat, the nozzle also including a seal pin received in the main bore and moveable between a closed position and an opened position, the seal pin including a sealing surface and further having a central bore extending therethrough from an entrance orifice to an exit orifice; an actuator coupled to the seal pin and configured to move the seal pin between the closed position and the open position, in the closed position the sealing surface engaging the valve seat and closing off the main bore from the outlet, in the open position the sealing surface being spaced apart from the valve seat; a source of molding medium, wherein the molding medium is a liquid product that is to be retained in the container, the source being the coupled to the nozzle and the molding medium being provided to the nozzle in a pressurized state; and whereby during a first molding stage the seal pin is in the closed position and the molding medium is injected as a liquid vector into the preform from the source through the central bore and the exit orifice, and thereafter the seal pin is moved to the open position and during a second molding stage the molding medium is injected into the preform from the source through the main bore and the outlet, the exit orifice being centrally located within the outlet.

In another aspect of the invention, the exit orifice has a diameter that is smaller than a diameter of the outlet.

In another aspect of the invention, the exit orifice is coaxial with the outlet.

In another aspect of the invention, the exit orifice is formed within a nipple on a distal end of the seal pin, the nipple extending into the outlet when the seal pin is in the closed position.

In another aspect of the invention, the nipple sealingly engages the outlet when the seal pin is in the closed position.

In another aspect of the invention, the nipple is adjacent to the sealing surface.

In another aspect of the invention, the exit orifice defines a spray angle of less than 5°.

In another aspect of the invention, the exit orifice defines a spray angle of about 0°.

In another aspect, the invention includes a flow straightener positioned within the central bore.

In another aspect of the invention, the flow straightener is spaced apart from the exit orifice.

In another aspect of the invention, the flow straightener defines a plurality of sub-passageways within the central bore.

In another aspect of the invention, sub-passageways are defined by at least one of a plurality of vanes oriented radially within the central bore, a baffle plate having an array of passageways therethrough and a plurality of tubes extending longitudinally within the central bore.

In another aspect, the invention further includes a rod positioned within the central bore and being moveable between a retracted position and an extended position, in the retracted position the rod is substantially positioned within the central bore and in the extended position a portion of the rod extends through and out of the exit orifice, the rod being in communication with the source of the molding medium and having an inner bore through which the molding medium is provided during the first molding stage.

In another aspect of the invention, the rod is in the retracted position when the seal pin is in the open position.

In another aspect of the invention, the rod is in the extended position when the seal pin is in the closed position.

In another aspect, the invention includes a centering rod, the centering rod being moveable between an extended position and a retracted position, in the extended position the centering rod extending into the mold cavity and in the retracted position the centering rod being retracted from the mold cavity.

In another aspect of the invention, an end of the centering rod is adapted to engage a closed end of the preform.

In another aspect of the invention, the end of the centering rod is dished shaped.

In another aspect, the invention includes a flow straightener positioned within the central bore, the flow straightener being spaced apart from the exit orifice and defining a plurality of flow passageways within the central bore.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIGS. 1A-1C are schematic illustrations of a hydraulic blow molding system incorporating a two-stage nozzle configuration incorporating the principles of the present invention;

FIGS. 3A-3C are schematic illustrations of a hydraulic blow molding system incorporating a two-stage nozzle configuration according to a third embodiment of the present invention;

FIGS. 4A-4C are a schematic illustration of the embodiment seen in FIGS. 1(a)-(c) further incorporating the use of a centering rod;

DETAILED DESCRIPTION

Figure 2C:
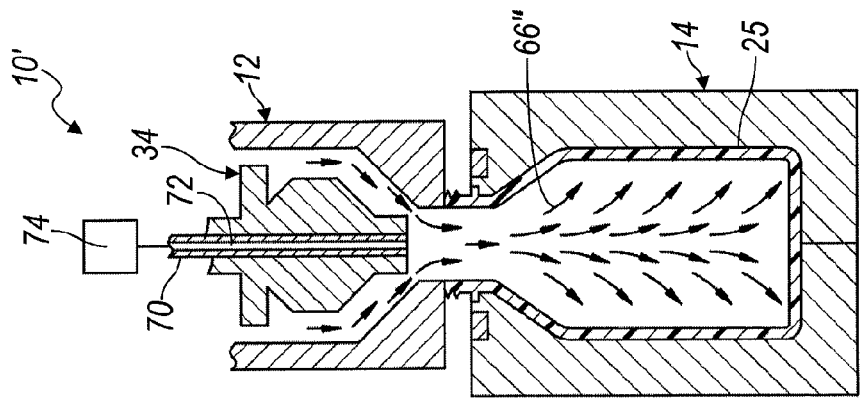
FIGS. 2A-2C are schematic illustrations of a hydraulic blow molding system incorporating a two-stage nozzle configuration according to a second embodiment of the present invention.

As mentioned above, in hydraulic blow molding, instead of air, the molding medium is a liquid. As used herein, the term liquid is intended to include not only those liquids with a viscosity near water (e.g. liquids consumed as beverages, including without limitation water, sports drinks, tea, etc.), but also those liquids with a viscosity substantially greater than water and known as viscous liquids (e.g. viscous liquids used as, without limitation, condiments such as ketchup or household products such as dishwashing liquid).

A traditional stretch rod may not be desired in hydraulic blow molding, where the final product is used as the molding medium. In such instances, the stretch rod can be a potential a source of product contamination and, resultantly, may require a complex clean-in-place system/process in order to ensure that product contamination does not occur. According to one aspect of the present invention, the traditional stretch rod is eliminated in favor of what is herein referred to as a liquid vector.

By employing the liquid vector, the initiation or complete axial stretching of the preform can be performed utilizing the end product; the product intended to be retained in the newly formed container. To effectuate this initial stretching of the preform, as well as the subsequent radial forming and complete filling of the container, in additional aspects of the present invention, a two-stage nozzle and method for forming the filled container is provided.

Two Stage Nozzle

Referring now to the drawings, a hydraulic blow molding system is schematically illustrated in FIGS. 1A-1C and generally designated at 10. The molding system 10 includes as its primary components a nozzle 12 and at least one mold 14, only one of which is shown in the drawings. The molding system 10 further includes a controller 11 coupled to the nozzle and configured to control all of the various operations and molding stages discussed below in connection with each embodiment and feature.

The mold 14 is generally formed by a pair of mold halves 16. Each of the mold halves 16 has an interior surface 18 that cooperate to define a mold cavity 20 in the shape of the desired container. The mold halves 16 are hinged or otherwise connected to one another so as to be opened and closed, thereby allowing the mold halves 16 to engage a preform 24 and position the body 26 of the preform 24 within the mold cavity.

The upper portion of the mold 14 is configured to receive and retain the preform 24. One means by which the preform 24 may be retained is by receiving the support or handling ring of the preform 24 within a correspondingly shaped recess in the top of the mold 14, with the threaded finish 22 of the preform 24 extending and being located above the mold 14. Various other alternate methods may also be employed to retain and engage the preform 24 with the mold 14, such as enclosing or capturing the support ring within a corresponding portion of the mold 14.

Prior to placing the preform 24 within the mold cavity 20, the body 26 of the preform 24 is heated to a temperature that is suitable for forming and filling the container 25. The preform 24 may be heated by various means, including passing of the preform 24 through an oven (not shown) past a bank of radiant or infrared heaters. Depending on the specifics of the preform and container design, the oven may be configured to induce a varied temperature profile along the longitudinal length of body 26, from the finish 22 down to a closed-end 28 of the preform 24.

The preform 24 may be formed from a variety of materials. One preferred material is polyethylene terephthalate (PET). Other materials from which the container may be formed include, without limitation, polyethylene, polypropylene, polyethylene naphthalate (PEN), thermoplastic blends and multilayer constructions of such materials. The present invention, however, is not intended to be restricted to any particular material.

With the heated preform 24 positioned within the mold 14, the body 26 of the preform 24 extends into the free space of the mold's cavity 20, as seen in FIG. 1A. Thereafter, the nozzle 12 is moved by an actuator 30, which may be a motor driven, pneumatically driven, or hydraulically driven actuator, to a position where the nozzle 12 engages the top or sealing surface of the preform's finish 22.

The nozzle 12 has two main components, namely a nozzle body 32 and a seal pin 34, with the seal pin 34 being located within a bore 38 of the nozzle body 32. Hereafter, this bore 38 is referred to as the main bore 38. The seal pin 34 is axially translatable within a main bore 38 between extended and retracted positions, which are further discussed below, by a second actuator 36. Like the first actuator 30, the second actuator 36 may also be motor driven, pneumatically driven, or hydraulically driven. Alternatively, a single actuator may be employed to effectuate and control movement of both the nozzle body 32 and the seal pin 34.

The main bore 38 of the nozzle body 32 has an inlet 40 for introducing a molding medium into the main bore 38 and an outlet 42 for ejecting the molding medium therefrom. Coupled to the main bore 38, by way of the inlet 40, is a source 44 of molding medium. The molding medium, when received by the main bore 38, is in a pressurized state and pressurization may occur or exist at the source 44 itself, or it may be developed en route to the nozzle 12 by means of a high pressure pump, piston or other means. To control the providing of the molding medium to the main bore 38, a housing valve 46 (shown in FIG. 1A, but omitted in FIGS. 1B and 1C) may optionally be provided.

In its lowermost or extended position, which is generally represented in FIGS. 1A and 1B, the seal pin 34 is located such that a nipple 52 on the distal end 62 of the seal pin 34 extends into the outlet 42, cooperating to form a fluid tight seal between the seal pin 34 and the nozzle body 32. Immediately adjacent to the outlet 42, the main bore 38 is provided with an interior frustoconical surface that defines a valve seat 48. While preferably provided in the frustoconical form, this surface may have other shapes so long as those shapes are capable of operating as a valve seat when engaged with corresponding sealing surface 50 of the seal pin 34. In the nozzle 12 of the illustrated embodiment, the sealing surface 50 of the seal pin 34 adjacent to the nipple 52 are defined by a correspondingly shaped, exterior frustoconical surface. When extended, the sealing surface 50 of the seal pin 34 sealingly engage the valve seat 48 of the main bore 38. This sealing engagement, along with the surface-to-surface engagement of the nipple 52 with surfaces defining the outlet 42, closes off fluid communication between the main bore 38 and the interior of the preform 24.

A bore is also defined through the seal pin 34 and is hereinafter referred to as the central bore 56. The central bore 56 extends from an entrance orifice 58 to an exit orifice 60, with the exit orifice 60 being provided within the nipple 52 on the distal end 54 of the seal pin 34. As such, the exit orifice 60 of the central bore 56 is coaxial with or centrally located within the outlet 42 of the main bore 38, and smaller in diameter than the outlet 42 of the main bore 38.

In a manner similar to the main bore 38, the central bore 56 is also coupled to the source 44 of the molding medium that is used to form and fill the container 25. A valve 64 or other mechanism controls the providing of the pressurized molding medium to the seal pin 34.

In a first stage of operation of the nozzle 12, the seal pin 34 has been extended by the actuator 36 such that the sealing surfaces 50 engages the valve seat 48, thereby sealing off the main bore 38 from the interior of the preform 24. The nature of the engagement between the valve element 50 and the valve seat 48 is such that no molding medium flows from the main bore 38. In this first stage, however, the valve 64 associated with the central bore 56 is opened and pressurized flow 66 of the molding medium is provided into the central bore 56 to be ejected out of the exit orifice 60.

Ejection of the molding medium from the exit orifice 60 is performed so as to define stream of liquid, a liquid vector 68, within the preform 24. As seen in FIG. 1B, the liquid vector 68, having a directed intensity and magnitude, is specifically directed to impinge upon the closed end 28 of the preform 24 with a high velocity and a force that is sufficient to initiate stretching of the preform 24. The specific velocity and force necessary to achieve the initiation of stretching will depend on various design criteria, including the design of the preform 24 and other factors. Preferably, the liquid vector 68 has a diameter of about 1 mm to 20 mm, and more preferably 1 mm to 6 mm. Additionally, the temperature of the liquid vector 68 must be such that it does not freeze or overly cool the preform 24. Rather, the temperature of the liquid vector 68 needs to allow for proper initial axial stretching, subsequent radial expansion and any further required axial stretching. As such, it is preferred that the temperature of the liquid vector 68 is in the range of about 10° C. to 90° C. The temperature of the liquid vector 68 is also preferably greater than the temperature of the subsequent flow (second stage flow) used to radially expand the preform 24, so as to not cool the preform 24 below its glass transition temperature thereby compromising the ability to effectively and fully form the container during the second stage of operation of the nozzle 12 and system 10. In this regard, the flow 66 of the molding medium may be heated to a temperature above that of the source 44, either before entry into the central bore 56 of the seal pin 34 or while in the central bore 56 itself. Such heating may be achieved by providing a heating element (not shown) within the seal pin 34 and adjacent to at least a portion of the central bore 56.

As suggested above, during the first stage of operation of the nozzle 12, the preform 24 may be partially stretched (see FIG. 1B where the closed-end 28 of the preform 24 is spaced apart from base surfaces 18 of the mold cavity 20) or the preform 24 may be fully stretched (the closed-end 28 of the preform 24 contacts (not shown) the base surfaces 18 of the mold cavity 20). The extent of stretching performed during this first stage of operation is also dependent upon the specific design of the preform 24, the container 25 and other processing factors.

Once initial stretching of the preform 24 has been performed to the desired extent, the seal pin 34 is retracted within the nozzle body 32 thereby disengaging the sealing surface 50 from the valve seat 48 and withdrawing the nipple 52 from the nozzle outlet 42. By doing so, the main bore 38 is brought into fluid communication with the interior of the preform 24 via the outlet 42. This is the second stage of operation of the nozzle 12 and is generally shown in FIG. 1C.

As the seal pin 34 is retracted, or prior thereto, the valve 46 coupled with the main bore 38 (if so provided) is opened and pressurized molding medium' is caused to flow through the main bore 38. With the various sealing surfaces disengaged, the molding medium is directed out of the nozzle outlet 42 and into the preform 24. With the opening of the nozzle outlet 42, a larger flow rate (volume of molding medium per unit of time) of the molding medium is established and injected into the perform 24 than is injected by the liquid vector 68 alone. Thus, the second flow rate (during the second stage) is greater than the first flow rate (during the first stage), but the velocity of second flow rate (the second velocity) is less than the velocity of the first flow rate (the first velocity). Preferably, the flow 66' from the main bore 38 is supplemental or cumulative with the flow 66 from the central bore 56. However, the two flows 66, 66' may be sequential with the flow 66 from the central bore 56 being stopped upon initiation of the flow 66' from the main bore 38 during the second stage.

The resultant flow of molding medium, designated at 66" in FIG. 1C, operates to radially and axially expand the preform 24 into full conformity with the surfaces 18 defining the cavity 20, thereby both forming and filling the container 25 with the molding medium, which is the commodity or end product to be distributed in the container 25.

Vector Rod

Figure 2B:
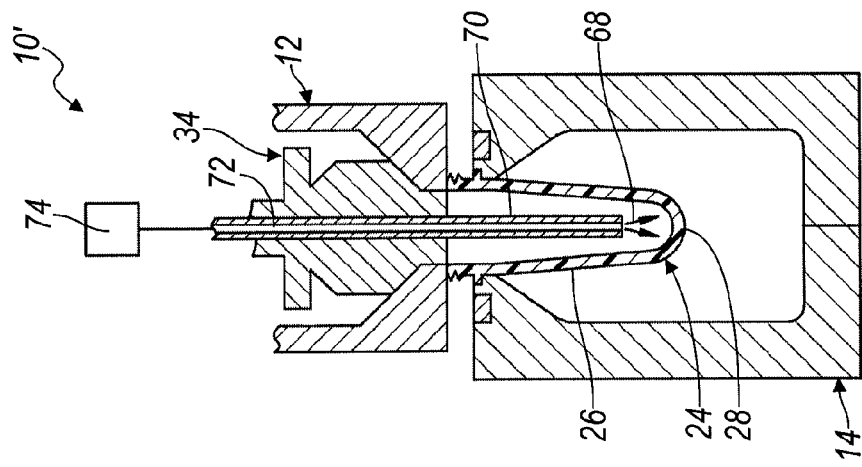
Figure 2A:
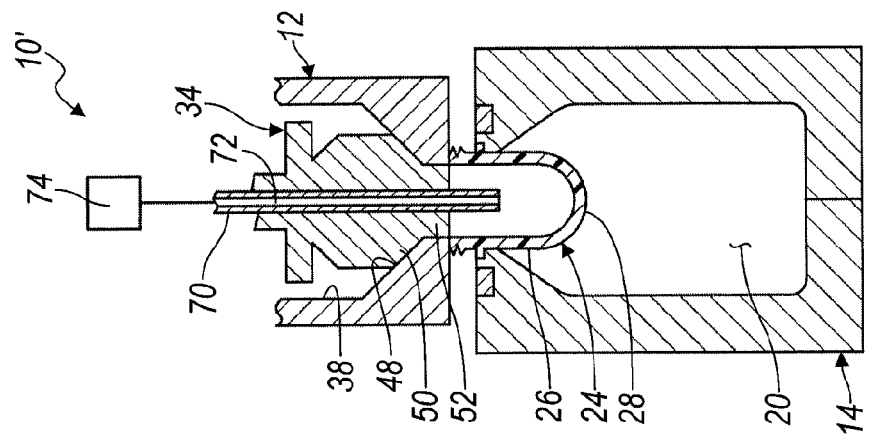

Referring now to FIGS. 2A-2C, a variation on the system 10 presented in FIGS. 1A-1C is illustrated therein. The system 10' is identical to the system 10 seen in the prior figures, except for the inclusion of a rod, or more specifically a hollow rod that is also referred to herein as a vector rod 70, and associated components. Those common features are, accordingly, not repeatedly discussed in connection with FIGS. 2A-2C. For a full discussion of those features, reference is made to the prior text. Also, FIGS. 2A-2C do not show the various actuators and valves illustrated in the prior figures, it being understood that the previously discussed actuators and valves can be individually or collectively applied to the current figures.

As briefly noted above, the system 10' includes an axially moveable vector rod 70 as part of the seal pin 34. More specifically, the vector rod 70 is located within the central bore 56 of the seal pin 34. With the vector rod 70 located in the central bore 56, the molding medium cannot flow directly through the central bore 56. To account for this, the vector rod 70 is coupled to the source 44 of molding medium, and the molding medium is provided through an inner bore 72 of the vector rod 70, instead of directly through the central bore 56.

During the first stage of operation of the nozzle 12, which is seen in FIG. 2B, as the liquid vector 68 is ejected from an outlet orifice 74 in the distal end of the vector rod 70, the vector rod 70 is extended by an actuator 74 and the liquid vector 68 is directed to impact on the closed-end 28 of the preform 24, thereby initiating stretching via the force of the liquid vector 68. Contrary to a traditional stretch rod, at no time does the vector rod 70 actually contact the closed-end 28 or any other portion of the preform 24. Rather, the distal end of the vector rod 70 is always spaced from the closed-end 28 of the preform 24.

Once stretching of the preform 24 has been completed, the vector rod 70 is withdrawn back into the central bore 56 of the seal pin 34. The withdrawal of the vector rod 70 into the central bore 56 is preferably performed prior to the commencement of the second stage of the nozzle 12. In other words, vector rod 70 is withdrawn into the central bore 56 of the seal pin 34 prior to retraction of the seal pin 34 and disengagement of the valve element 50 and valve seat 48. Withdrawn as such, the vector rod 70 is contained within the seal pin 34 prior to flowing of the molding medium from the outlet 42 of the nozzle body 32. By fully retracting the vector rod 70 prior to introduction of the second stage flow from the main bore 38, contact between the exterior of the vector rod 70 and the molding medium is minimized.

While discussed with the vector rod 70 being retracted prior to commencement of the second stage of the nozzle 12, this retraction of the vector rod 70 is optional, and the second stage may begin while the vector rod 70 is extended.

In those instances where the vector rod 70 remains extended during the second stage of operation, the vector rod 70 does not remain at its fully extended position. Rather, the vector rod 70 is partially retracted to a position that assists in setting the final fill height of the molding medium within the container 25. If the vector rod 70 were to remain fully extended during the entire second stage of operation, upon withdrawn of the vector rod 70 the level of the molding medium would drop in an amount corresponding to the volume of the molding medium that was displaced by the vector rod 70. With the vector rod 70 fully extended, this resulting drop in the fill level would cause the final fill level of the molding medium to be below the desired level for a full container. To counteract any over displacement by the vector rod 70, the vector rod 70 is partially retracted from its fully extended position during the second stage of operation. When the fill level of the molding medium, with the vector rod 70 so retracted, reaches a predetermined level, the seal pin 34 is advanced to close off the main bore 38 and any flow of molding medium through the vector rod 70 is also stopped. Thus, further molding medium is prevented from being dispensed into the container 25. The predetermined level is a fill level that accounts for the displacement of molding medium caused by the vector rod 70. Thereafter, the vector rod 70 is withdrawn out of the molding medium and back into the seal pin 34. The withdrawal of the vector rod 70 causes the fill level of the molding medium to drop from the displaced predetermined level to the desired, final fill level of the container 25.

Thereafter, the formed and filled container 25 is removed from the mold assembly 14 and capped.

Flow Through Seal Pin and Plug Rod

An alternative construction for the seal pin is illustrated in FIGS. 3A-3C. The seal pin of this embodiment, designated as 34', differs with regard to the valving of the seal pin 34' and how the molding medium is provided to and through the central bore 56. In all other aspects of construction and operation, the embodiment of FIGS. 3A-3C are the same as that illustrated and discussed in connection with FIGS. 1A-1C and 2A-2C. Accordingly, while some common elements of construction with the previous embodiments are illustrated in FIGS. 3A-3C and designated with the same reference numerals, other elements are omitted for clarity and convenience, but will be understood as also being applicable to FIGS. 3A-3C as if fully illustrated and described therewith.

As seen in FIG. 3A-3C, the seal pin 34' includes a central bore 56 through which the molding medium flows and is ejected from an exit orifice 60 thereof. Unlike the prior embodiments, however, a valve or plug rod 76 is located within the central bore 56 and is axially movable between an extended position and a retracted position. In the extended position, the plug rod 76 operates so as to occlude the central bore 56 and prevent molding medium from flowing through the seal pin 34'. In the retracted position, the plug rod 76 is located to allow for flowing of the molding medium through the seal pin 34' and injecting into the preform 24 during the first stage of operation of the nozzle 12.

Since the plug rod 76 is located within a central portion of the central bore 56, the molding medium cannot flow centrally through the entire length of the central bore 56. This is overcome by forming in the seal pin 34' a series of lateral passageways 78 that extend from the sides of the seal pin 34' to the central bore 56. Preferably, the lateral passageways 78 extend at an angle (obliquely) from the exterior surface or sides 80 of the seal pin 34' to the central bore 56, generally converging in the direction of the nipple 52 on the distal end 54 of the seal pin 34'. Alternatively, the lateral passageways 78 may be oriented perpendicularly with respect to the central bore 56.

In its extended position, the plug rod 76 is positioned so that a portion of the plug rod 76 extends over the opening or interface 81 of the lateral passageways 78 with the central bore 56, thereby closing off fluid communication between the central bore 56 and the lateral passageways 78. To facilitate a fluid tight seal, annular grooves 82 with associated seals 84, such as O-rings, may be provided within the central bore 56 at axial locations on opposite sides of the interface 81. While the plug rod 76 only needs to extend a distance that allows for the terminal end 86 of the plug rod 76 to engage the seal 84 closest to the nipple 52, the plug rod 76 may extend a distance such that it's terminal end 86 is coterminous with or slightly protruding from the nipple 52. Positioning of the terminal end 86 in this manner limits the amount of residual molding material 66 in the central bore 56 adjacent to the exit orifice 60. The extended position of the plug rod 76 is seen in FIG. 3A.

It is also preferred that the lateral passageways 78 be disposed generally toward the distal end 54 of the seal pin 34'. By providing the lateral passageways 78 toward the distal end 54 of the seal pin 34', the required stroke of the plug rod 76, between its extended position (closing off the central bore 56) and its retracted position (opening up the central bore 56), can be minimized.

In its retracted position, the plug rod 76 is moved within the central bore 56 by an actuator 88 to a position where the plug rod 76 is withdrawn past the interface 81 of the lateral passageways 78, uncovering the interface 81 and allowing fluid communication between the passageway 78 and the central bore 56. As seen in FIG. 3B, the plug rod 76 is withdrawn such that its terminal end 86 does not fully or partially block the interface 81, allowing for unobstructed communication between the lateral passageways 78 and the central bore 56.

During operation of the system 10, after a heated preform 24 has been positioned in the mold assembly 14, the nozzle 12 is moved by its actuator 30 to seal against the sealing or upper surface of the finish 22 of the preform 24. In this initial position, the sealing surfaces 50 of the seal pin 34' engage the valve seat 48 of the nozzle body 32 and the nipple 52 is positioned within the outlet opening 42, thereby closing off the main bore 38 and preventing the flow of molding medium through the central bore 56.

To initiate the first operational stage of the nozzle 12, the plug rod 76 is moved by its associated actuator 88 into the retracted position. Once the plug rod 76 is retracted beyond the interface 81 of lateral passageways 78 with the central bore 56, the central bore 56 is in fluid communication with the main bore 38 and molding medium flows from the main bore 38, through the lateral bores 78 into the central bore 56, where it is injected through the exit orifice 60 into the preform 24. As with the prior embodiments, the molding medium is ejected from the exit orifice 60 in the form of a liquid vector 68, directed toward the closed-end 28 of the preform 24, with a force that is sufficient to initiate stretching of the preform 24 during this first stage of operation of the nozzle 12.

Once sufficient axial stretching of the preform 24 has been undertaken, the second operational stage of the nozzle 12 is initiated. This second stage of operation begins with the retracting of the seal pin 34' and the disengaging of the sealing surfaces 50 from the valve seat 48. Molding medium then flows around the seal pin 34', through the outlet 42 and into the stretched preform 24. The plug rod 76 may be maintained in its withdrawn position thereby allowing the molding medium to also flow through the lateral passageways 78 and the central bore 56 during the second stage of operation. Alternatively, the plug rod 76 may be extended to force all of the flow of molding medium around the seal pin 34'.

As with the prior embodiments, the flow during the second stage of operation is greater than the flow rate of the liquid vector 68 alone during the first stage. This increased flow rate of the second stage flow causes radial expansion, and further axial stretching (if required), of the preform 24 into conformity with the surfaces 18 defining the mold cavity 20, thereby forming the container 25 illustrated in FIG. 3C.

Once the container 25 has been completely formed and filled, the plug rod 76 is advanced within the central bore 56, if this has not already been completed, until it again seals off the interface 81 between the lateral passageways 78 and the central bore 56 Generally at the same time, the seal pin 34 is extended so that the sealing surface 50 engages the valve seat 48 of the nozzle body 32, closing off the main bore 38.

If desired, prior to closing off of the main bore 38, the plug rod 76 may be advanced to not only close off the lateral passageways 78 of the central bore 56, but to also extend beyond the end of the nozzle 12 and into the container 25 and the molding medium. Extending into the molding medium, the plug rod 76 may be used to displace a corresponding volume of the molding medium, thereby aiding in defining the final level of the molding medium in the container 25, as previously discussed.

Thereafter, the formed and filled container 25 is removed from the mold assembly 14 and capped.

Centering Rod

To facilitate the stretching of the preform 24 and formation of the container 25, each of the embodiments discussed herein may employ a centering rod. A centering rod 92 is illustrated in connection with FIGS. 4A-4C.

As seen therein, the centering rod 92 extends upwardly through the mold 14, generally between mold halves 16, and is positioned such that an end or contact tip 94 engages the closed-end 28 of the preform 24. The contact tip 94 may be provided with a shape on its end face that conforms with the shape of the closed-end 20 of the preform 24. In the present instance, the end face of the contact tip 94 is provided with a concave or dished-shape. The concave shape of the contact tip 94 may further include a central recess formed therein and designed to receive any vestige of the gate used when initially molding the preform 24.

As seen in FIG. 4A, the extended centering rod 92 engages the closed-end 28 of the preform 24 prior to initial stretching of the preform 24 by the liquid vector 68. After the liquid vector 68 is initiated, the centering rod 92 is retracted generally at the rate at which the preform 24 is stretched. The retraction of the centering rod 92 may be directly in response to the stretching of the preform 24, i.e. the centering rod 92 may be acted upon and forced to retract by the stretching preform 24. Alternatively, the retraction of the centering rod 92 may be controlled by the actuator 96 used to initial extend the centering rod 92 into engagement with the preform 24. In this latter instance, controlling the retraction the centering rod 92 may utilize a feedback loop that employ sensors 98 measuring the pressure being exerted on the contact tip 94 or centering rod 92 by the liquid vector 68. Through the use of the feedback loop, the rate of stretching of the preform 24 may be held or controlled at a desired and consistent rate.

Flow Straightening and Conditioning

To ensure that the above mentioned liquid vector 68 is formed in a tightly formed and directed stream, the exit orifice 60 has a terminal portion that defines a spray angle 99. This is generally shown in FIG. 5, where the spray angle 99 is exaggerated in size for clarity purposes. As seen in all the figures, the central bore 56 is provided with a constant inner diameter over its length. By contrast, the diameter defined by the spray angle 99 is the same as or larger than the diameter of the central bore 56. Preferably, the spray angle is less than 5° and, more preferably, the same as the central bore 56 and therefore equal to 0° or about 0°.

Furthermore, it has been found that the nature of the flow of the molding material 66 through the central bore 56 is preferably laminar and not turbulent. Achieving laminar flow in a channel may be accomplished by providing a straight flow channel for a distance of at least 8 to 12 times the diameter of the channel. This, however, is generally not feasible with the nozzles described herein because of size and/or space constraints associated with the seal pin 34.

Figure 5A:
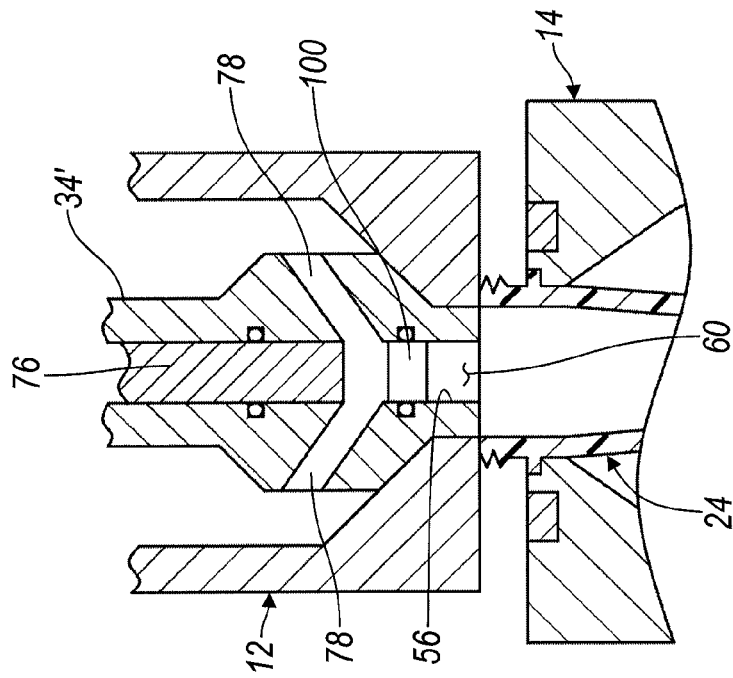
FIG. 5A is a schematic illustration showing the spray angle formed in the exit orifice of the seal pin's pin bore and also showing a flow conditioner positioned upstream thereof.
Figure 5B:
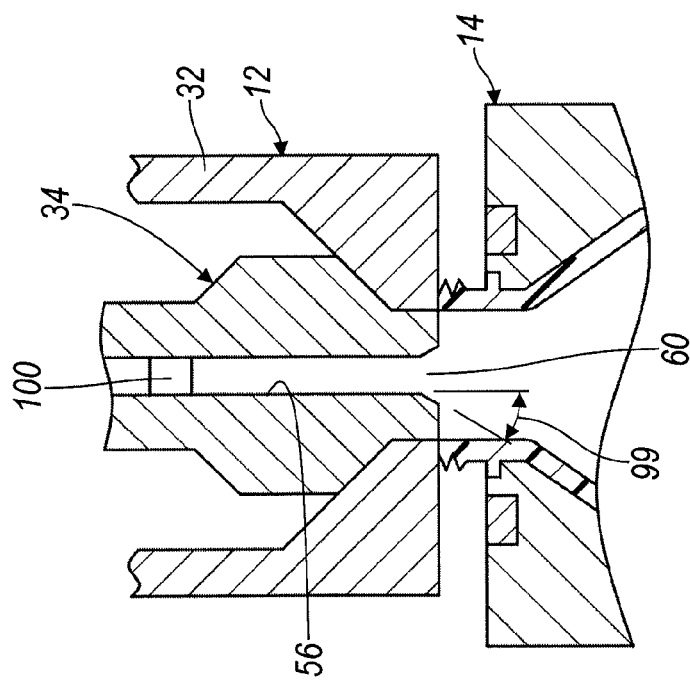
FIG. 5B is a schematic illustration showing a flow conditioner incorporated into a nozzle of the type generally seen in FIGS. 3A-3B.

To achieve laminar flow and decrease turbulence in the flow of molding medium prior to its discharge from the exit orifice 60, a flow conditioner or straightener 100 is provided within the central bore 56. This is schematically shown in FIGS. 5A and 5B. When employed, the flow conditioner 100 is located beyond the last bend or elbow in the central bore 56, generally before the exit orifice 60. Preferably, the flow conditioner 100 is located more proximate to last bend or elbow, than to the exit orifice 60.

Figure 6B:
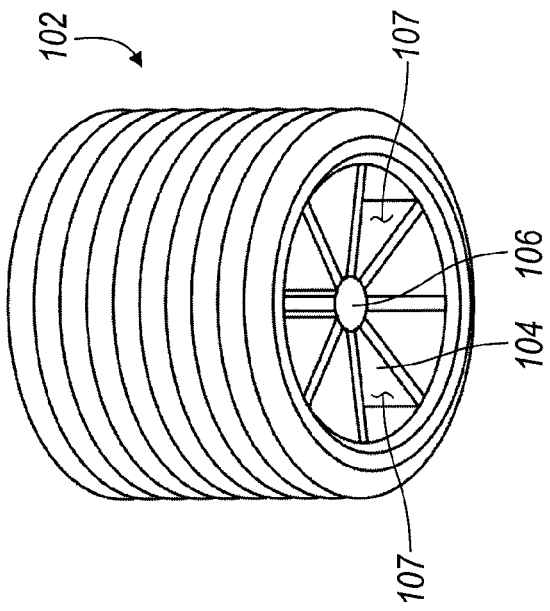
FIGS. 6A-6E illustrate variations of flow conditioners that may be provided within the pin bore of the seal pin of the various embodiments.
Figure 6A:
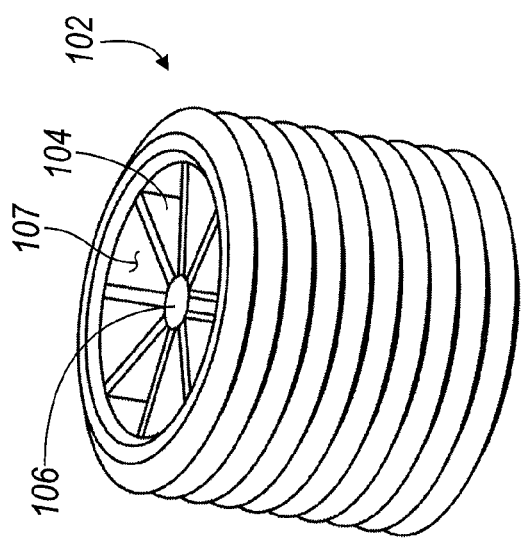
Figure 6D:
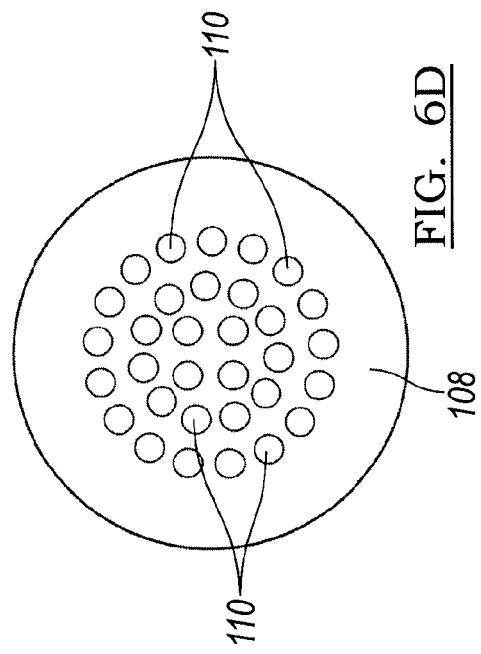
Figure 6C:
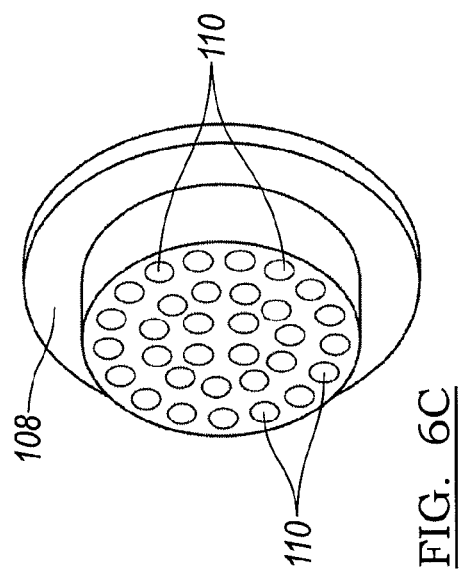
Figure 6E:
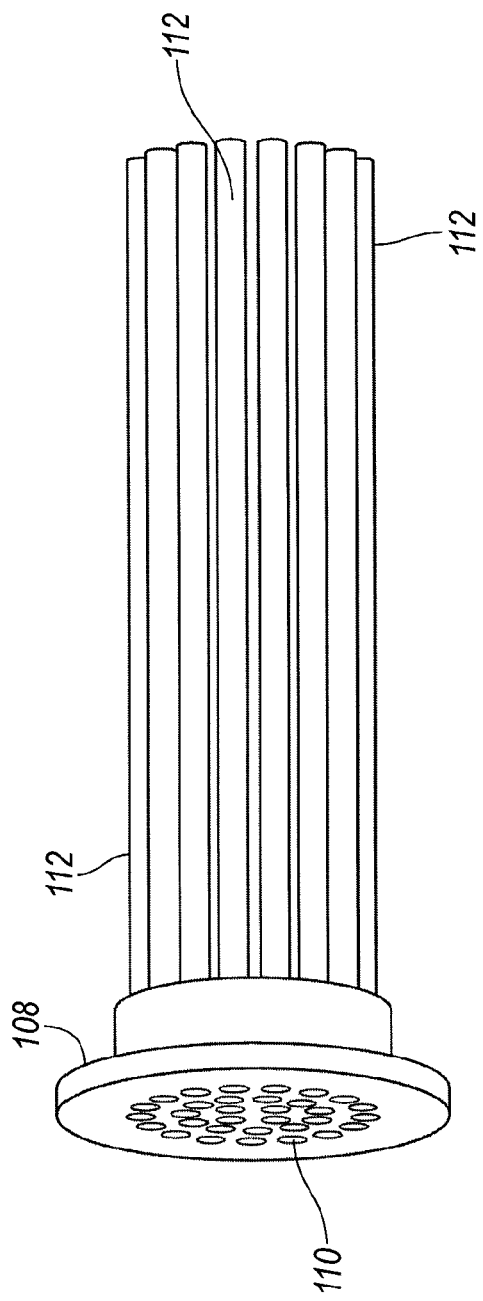

Various flow conditioners 100 are illustrated in FIGS. 6A-6E. As seen in FIGS. 6A and 6B, the flow conditioner 100 may be provided as an insert 102 that is threadably positioned within the central bore 56 and which includes a series of connected, radially extending vanes 104, emanating from a center hub 106, and between which flow passages 107 are provided. Alternatively, the insert may be provided in the form of a baffle plate 108 having an array of passageways 110 extending axially therethrough. The passageways 110 preferably are provided over the entire area of the baffle plate 107 corresponding to the cross-sectional area of the central bore 56 and have a length corresponding to the thickness of the baffle 108. Alternatively, the passageways 110 may extend beyond the thickness of the baffle 108 through the providing of extensions 112 in the form of straight conduits or tubing associated with each of the passageways 110.

With the teaching of the present invention, it is seen that the end product, the molding medium, is less exposed to oxygen and less likely to experience negative reactions therewith. Additionally, by providing the first flow with a smaller diameter, the first flow is more axial and directed, thereby better promoting the initiation of axial stretching when compared with a wider, less directed flow. In some of the embodiments, once the molding medium is dispensed from the nozzle, further contact with the molding medium does not occur, resulting in less probability of contamination in the molding system.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A method of hydraulic blow molding a container from a preform, the method comprising the steps of:
   positioning a preform within a mold having surfaces defining a cavity in the shape of the container;
   injecting a molding medium into the preform during a first molding stage, the molding medium being a liquid, being injected at a first flow rate and being specifically directed at a closed end of the preform;
   axially stretching the preform in response to a force exerted on the closed end of the preform by the molding medium during the first molding stage;
   injecting the molding medium into the preform during a second molding stage, the molding medium being injected at a second flow rate that is different from the first flow rate during the second molding stage; and radially expanding the preform into the shape of the container during the second molding stage.

2. A method of hydraulic blow molding a container from a preform, the method comprising the steps of:

positioning a preform within a mold having surfaces defining a cavity in the shape of the container;

injecting a molding medium into the preform during a first molding stage, the molding medium being a liquid, being injected at a first flow rate and being specifically directed at a closed end of the preform;

axially stretching the preform in response to a force exerted on the closed end of the preform by the molding medium during the first molding stage;

injecting the molding medium into the preform during a second molding stage, the molding medium being injected at a second flow rate that is greater than the first flow rate during the second molding stage; and radially expanding the preform into the shape of the container during the second molding stage.

3. A method of hydraulic blow molding a container from a preform, the method comprising the steps of:

positioning a preform within a mold having surfaces defining a cavity in the shape of the container;

injecting a molding medium into the preform during a first molding stage, the molding medium being a liquid, being injected at a first flow rate and being specifically directed at a closed end of the preform;

axially stretching the preform in response to a force exerted on the closed end of the preform by the molding medium during the first molding stage;

injecting the molding medium into the preform during a second molding stage, the molding medium being injected at a second flow rate that is different from the first flow rate during the second molding stage;

radially expanding the preform into the shape of the container during the second molding stage; and wherein the molding medium is ejected during the first molding stage from an exit orifice having a diameter that is less than a diameter of an outlet from which the molding medium is ejected during the second stage.

4. The method of claim 1, wherein the step of axially stretching the preform is solely initiated by the force exerted on the preform by the molding medium during the first molding stage.

5. The method of claim 1, wherein the injecting of the molding medium during the first and second molding stages is sequential.

6. The method of claim 1, wherein the injecting of the molding medium during the second stage molding is cumulative with the injecting of the molding medium during the first molding stage.

7. The method of claim 1, wherein the molding medium is passed through a flow straightener prior to being injecting into the preform during the first molding stage.

8. The method of claim 1, wherein the step of axially stretching the preform includes the step of introducing a rod into the preform and injecting the molding medium into the preform through the rod.

9. The method of claim 8, further comprising the step of advancing the rod into the preform during the step of axially stretching the preform, and the step of continuing injecting of the molding medium into the preform as the rod is being advanced.

10. The method of claim 9, wherein during the step of advancing the rod, the rod is prevented from contacting the preform.

11. The method of claim 8, further comprising the step of retracting the rod prior to the step of radially expanding the preform.

12. The method of claim 8, further comprising the step of retracting the rod during the step of radially expanding the preform.

13. The method of claim 8, further comprising the step of extending a centering rod into the mold cavity and engaging a closed end of the preform with the centering rod.

14. The method of claim 1, further comprising the step of extending a centering rod into the mold cavity and engaging a closed end of the preform with the centering rod.

15. The method of claim 14, wherein the centering rod engages the closed end of the preform prior to the axially stretching step.

16. The method of claim 14, wherein during the step of axially stretching the preform, the method further comprises the step of retracting the centering rod while maintaining the centering rod engaged with the closed end of the preform.

17. The method of claim 14, wherein the molding medium is passed through a flow straightener prior to injecting into the preform during the first molding stage.

18. The method of claim 1, wherein the second flow rate exhibits a second velocity and the first flow rate exhibits a first velocity, the first velocity being greater than the second velocity.

19. A molding system for hydraulic blow molding of a preform into a container, the molding system comprising:

a nozzle, the nozzle including nozzle body having a main bore extending therethrough from an inlet to an outlet, portions of the main bore defining a valve seat, the nozzle also including a seal pin received in the main bore and moveable between a closed position and an opened position, the seal pin including a sealing surface and further having a central bore extending therethrough from an entrance orifice to an exit orifice;

an actuator coupled to the seal pin and configured to move the seal pin between the closed position and the open position, in the closed position the sealing surface engaging the valve seat and closing off the main bore from the outlet, in the open position the sealing surface being spaced apart from the valve seat;

a source of molding medium, wherein the molding medium is a liquid product that is to be retained in the container, the source being the coupled to the nozzle and the molding medium being provided to the nozzle in a pressurized state; and whereby during a first molding stage the seal pin is in the closed position and the molding medium is injected as a liquid vector into the preform from the source through the central bore and the exit orifice, and thereafter the seal pin is moved to the open position and during a second molding stage the molding medium is injected into the preform from the source through the main bore and the outlet, the exit orifice being centrally located within the outlet.

20. The molding system of claim 19, wherein the exit orifice has a diameter that is smaller than a diameter of the outlet.

21. The molding system of claim 19, wherein the exit orifice is coaxial with the outlet.

22. The molding system of claim 19, wherein the exit orifice is formed within a nipple on a distal end of the seal pin, the nipple extending into the outlet when the seal pin is in the closed position.

23. The molding system of claim 22, wherein the nipple sealingly engages the outlet when the seal pin is in the closed position.

24. The molding system of claim 19, wherein the nipple is adjacent to the sealing surface.

25. The molding system of claim 19, wherein the exit orifice defines a spray angle of less than 5°.

26. The molding system of claim 19, wherein the exit orifice defines a spray angle of about 0°.

27. The molding system of claim 19, further comprising a flow straightener positioned within the central bore.

28. The molding system of claim 27, wherein the flow straightener is spaced apart from the exit orifice.

29. The molding system of claim 27, wherein the flow straightener defines a plurality of sub-passageways within the central bore.

30. The molding system of claim 29, wherein the sub-passageways are defined by at least one of a plurality of vanes oriented radially within the central bore, a baffle plate having an array of passageways therethrough and a plurality of tubes extending longitudinally within the central bore.

31. The molding system of claim 19, further comprising a rod positioned within the central bore and being moveable between a retracted position and an extended position, in the retracted position the rod is substantially positioned within the central bore and in the extended position a portion of the rod extends through and out of the exit orifice, the rod being in communication with the source of the molding medium and having an inner bore through which the molding medium is provided during the first molding stage.

32. The molding system of claim 31, wherein the rod is in the retracted position when the seal pin is in the open position.

33. The molding system of claim 31 wherein the rod is in the extended position when the seal pin is in the closed position.

34. The molding system of claim 19, further comprising a centering rod, the centering rod being moveable between an extended position and a retracted position, in the extended position the centering rod extending into the mold cavity and in the retracted position the centering rod being retracted from the mold cavity.

35. The molding system of claim 34, wherein an end of the centering rod is adapted to engage a closed end of the preform.

36. The molding system of claim 34, wherein the end of the centering rod is dished shaped.

37. The molding system of claim 34, further comprising a flow straightener positioned within the central bore, the flow straightener being spaced apart from the exit orifice and defining a plurality of flow passageways within the central bore.

38. The molding system of claim 19, wherein the exit orifice has a diameter in the range of 1 mm to 20 mm.

* * * * *